United States Patent
Aravamudan et al.

(10) Patent No.: US 10,146,840 B2
(45) Date of Patent: Dec. 4, 2018

(54) USER INTERFACE METHODS AND SYSTEMS FOR SELECTING AND PRESENTING CONTENT BASED ON USER RELATIONSHIPS

(71) Applicant: Veveo, Inc., Andover, MA (US)

(72) Inventors: Murali Aravamudan, Andover, MA (US); Kajamalai G. Ramakrishnan, Nashua, NH (US); Rakesh Barve, Bangalore (IN); Sashikumar Venkataraman, Andover, MA (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 0 days.

(21) Appl. No.: 14/793,074

(22) Filed: Jul. 7, 2015

(65) Prior Publication Data
US 2015/0324367 A1   Nov. 12, 2015

Related U.S. Application Data

(63) Continuation of application No. 14/175,189, filed on Feb. 7, 2014, now Pat. No. 9,087,109, which is a
(Continued)

(51) Int. Cl.
*G06F 17/30* (2006.01)
*G06F 3/0484* (2013.01)
(Continued)

(52) U.S. Cl.
CPC ........ *G06F 17/3053* (2013.01); *G06F 3/0481* (2013.01); *G06F 3/0482* (2013.01);
(Continued)

(58) Field of Classification Search
USPC ........ 707/607, 609, 687, 705, 790, 813, 821
See application file for complete search history.

(56) References Cited

U.S. PATENT DOCUMENTS

| 252,873 A | 1/1882 | Freese |
| 1,261,167 A | 4/1918 | Russell |

(Continued)

FOREIGN PATENT DOCUMENTS

| EP | 1 763 233 | 3/2007 |
| EP | 1841219 A2 | 10/2007 |

(Continued)

OTHER PUBLICATIONS

U.S. Appl. No. 11/738,138, filed Apr. 20, 2007.
(Continued)

*Primary Examiner* — Sana A Al-Hashemi
(74) *Attorney, Agent, or Firm* — Haley Guiliano LLP

(57) ABSTRACT

A user-interface method of selecting and presenting a collection of content items based on user navigation and selection actions associated with the content is provided. The method includes associating a relevance weight on a per user basis with content items to indicate a relative measure of likelihood that the user desires the content item. The method includes receiving a user's navigation and selections actions for identifying desired content items, and in response, adjusting the associated relevance weight of the selected content item and group of content items containing the selected item. The method includes, in response to subsequent user input, selecting and presenting a subset of content items and content groups to the user ordered by the adjusted associated relevance weights assigned to the content items and content groups.

16 Claims, 11 Drawing Sheets

Related U.S. Application Data continuation of application No. 13/765,335, filed on Feb. 12, 2013, now Pat. No. 8,688,746, which is a continuation of application No. 13/479,820, filed on May 24, 2012, now Pat. No. 8,423,583, which is a continuation of application No. 13/336,660, filed on Dec. 23, 2011, now Pat. No. 8,375,069, which is a continuation of application No. 13/034,034, filed on Feb. 24, 2011, now Pat. No. 8,086,602, which is a continuation of application No. 12/326,485, filed on Dec. 2, 2008, now Pat. No. 7,899,806, which is a continuation of application No. 11/738,101, filed on Apr. 20, 2007, now Pat. No. 7,461,061.

(60) Provisional application No. 60/793,537, filed on Apr. 20, 2006, provisional application No. 60/793,540, filed on Apr. 20, 2006.

(51) Int. Cl.
*G06F 3/0482* (2013.01)
*G06F 3/0481* (2013.01)

(52) U.S. Cl.
CPC .... *G06F 3/04842* (2013.01); *G06F 17/30554* (2013.01); *G06F 17/30699* (2013.01); *G06F 17/30864* (2013.01); *G06F 17/30867* (2013.01); *Y10S 707/99933* (2013.01); *Y10S 707/99934* (2013.01); *Y10S 707/99935* (2013.01); *Y10S 707/99942* (2013.01); *Y10S 707/99943* (2013.01)

(56) References Cited

U.S. PATENT DOCUMENTS

| | | |
|---|---|---|
| 4,045,777 A | 8/1977 | Mierzwinski et al. |
| 4,453,217 A | 6/1984 | Boivie |
| 4,760,528 A | 7/1988 | Levin |
| 4,797,855 A | 1/1989 | Duncan, IV et al. |
| 4,893,238 A | 1/1990 | Venema |
| 5,224,060 A | 6/1993 | Ma |
| 5,337,347 A | 8/1994 | Halstead-Nussloch et al. |
| 5,369,605 A | 11/1994 | Parks |
| 5,487,616 A | 1/1996 | Ichbiah |
| 5,532,754 A | 7/1996 | Young et al. |
| 5,557,686 A | 9/1996 | Brown et al. |
| 5,600,364 A | 2/1997 | Hendricks |
| 5,623,406 A | 4/1997 | Ichbiah |
| 5,635,989 A | 6/1997 | Rothmuller |
| 5,732,216 A | 3/1998 | Logan et al. |
| 5,745,889 A | 4/1998 | Burrows |
| 5,774,588 A | 6/1998 | Li |
| 5,802,361 A | 9/1998 | Wang et al. |
| 5,805,155 A | 9/1998 | Allibhoy et al. |
| 5,818,437 A | 10/1998 | Grover et al. |
| 5,828,420 A | 10/1998 | Marshall et al. |
| 5,828,991 A | 10/1998 | Skiena et al. |
| 5,835,087 A | 11/1998 | Herz et al. |
| 5,859,662 A | 1/1999 | Cragun et al. |
| 5,872,834 A | 2/1999 | Teitelbaum |
| 5,880,768 A | 3/1999 | Lemmons et al. |
| 5,896,444 A | 4/1999 | Perlman et al. |
| 5,912,664 A | 6/1999 | Eick et al. |
| 5,930,788 A | 7/1999 | Wical |
| 5,937,422 A | 8/1999 | Nelson et al. |
| 5,945,928 A | 8/1999 | Kushler et al. |
| 5,945,987 A | 8/1999 | Dunn |
| 5,953,541 A | 9/1999 | King et al. |
| 6,005,565 A | 12/1999 | Legall et al. |
| 6,005,597 A | 12/1999 | Barrett et al. |
| 6,006,225 A | 12/1999 | Bowman et al. |
| 6,008,799 A | 12/1999 | Van Kleeck |
| 6,009,459 A | 12/1999 | Belfiore et al. |
| 6,011,554 A | 1/2000 | King et al. |
| 6,041,311 A | 3/2000 | Chislenko et al. |
| 6,047,300 A | 4/2000 | Walfish et al. |
| 6,075,526 A | 6/2000 | Rothmuller |
| 6,133,909 A | 10/2000 | Schein et al. |
| 6,169,984 B1 | 1/2001 | Bogdan |
| 6,184,877 B1 | 2/2001 | Dodson et al. |
| 6,189,002 B1 | 2/2001 | Roitblat |
| 6,204,848 B1 | 3/2001 | Nowlan et al. |
| 6,223,059 B1 | 4/2001 | Haestrup |
| 6,239,794 B1 | 5/2001 | Yuen et al. |
| 6,260,050 B1 | 7/2001 | Yost et al. |
| 6,266,048 B1 | 7/2001 | Carau, Sr. |
| 6,266,814 B1 | 7/2001 | Lemmons et al. |
| 6,269,361 B1 | 7/2001 | Davis et al. |
| 6,286,064 B1 | 9/2001 | King et al. |
| 6,292,804 B1 | 9/2001 | Ardoin et al. |
| 6,307,548 B1 | 10/2001 | Flinchem et al. |
| 6,307,549 B1 | 10/2001 | King et al. |
| 6,360,215 B1 | 3/2002 | Judd et al. |
| 6,377,945 B1 | 4/2002 | Risvik |
| 6,383,080 B1 | 5/2002 | Link et al. |
| 6,385,602 B1 | 5/2002 | Tso et al. |
| 6,388,714 B1 | 5/2002 | Schein et al. |
| 6,392,640 B1 | 5/2002 | Will |
| 6,438,579 B1 | 8/2002 | Hosken |
| 6,438,751 B1 | 8/2002 | Voyticky et al. |
| 6,463,586 B1 | 10/2002 | Jerding |
| 6,466,933 B1 | 10/2002 | Huang et al. |
| 6,529,903 B2 | 3/2003 | Smith et al. |
| 6,543,052 B1 | 4/2003 | Ogasawara |
| 6,564,213 B1 | 5/2003 | Ortega et al. |
| 6,564,313 B1 | 5/2003 | Kashyap |
| 6,564,378 B1 | 5/2003 | Satterfield et al. |
| 6,594,657 B1 | 7/2003 | Livowsky |
| 6,600,496 B1 | 7/2003 | Wagner et al. |
| 6,614,422 B1 | 9/2003 | Rafii et al. |
| 6,614,455 B1 | 9/2003 | Cuijpers et al. |
| 6,615,248 B1 | 9/2003 | Smith |
| 6,622,148 B1 | 9/2003 | Noble et al. |
| 6,631,496 B1 | 10/2003 | Li et al. |
| 6,662,177 B1 | 12/2003 | Martino et al. |
| 6,664,980 B2 | 12/2003 | Bryan et al. |
| 6,708,336 B1 | 3/2004 | Bruette |
| 6,721,713 B1 * | 4/2004 | Guheen ................ G06Q 50/01 705/1.1 |
| 6,721,954 B1 | 4/2004 | Nickum |
| 6,732,369 B1 | 5/2004 | Schein et al. |
| 6,734,881 B1 | 5/2004 | Will |
| 6,735,695 B1 | 5/2004 | Gopalakrishnan et al. |
| 6,756,997 B1 | 6/2004 | Ward, III et al. |
| 6,757,906 B1 | 6/2004 | Look et al. |
| 6,766,526 B1 | 7/2004 | Ellis |
| 6,772,147 B2 | 8/2004 | Wang |
| 6,785,671 B1 | 8/2004 | Bailey et al. |
| 6,801,909 B2 | 10/2004 | Delgado et al. |
| 6,835,602 B2 | 12/2004 | Norskov et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith et al. |
| 6,865,746 B1 | 3/2005 | Herrington et al. |
| 6,907,273 B1 | 6/2005 | Smethers |
| 6,965,374 B2 | 11/2005 | Villet et al. |
| 6,999,959 B1 | 2/2006 | Lawrence et al. |
| 7,013,304 B1 | 3/2006 | Schuetze et al. |
| 7,117,207 B1 | 10/2006 | Kerschberg et al. |
| 7,130,866 B2 | 10/2006 | Schaffer |
| 7,136,845 B2 | 11/2006 | Chandrasekar et al. |
| 7,136,854 B2 | 11/2006 | Smith et al. |
| 7,146,627 B1 | 12/2006 | Ismail et al. |
| 7,149,983 B1 | 12/2006 | Robertson et al. |
| 7,165,098 B1 | 1/2007 | Boyer et al. |
| 7,185,335 B2 | 2/2007 | Hind et al. |
| 7,191,238 B2 | 3/2007 | Ucjoda |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,269,548 B2 | 9/2007 | Fux et al. |

(56) References Cited

U.S. PATENT DOCUMENTS

| | | |
|---|---|---|
| 7,293,231 B1 | 11/2007 | Gunn et al. |
| 7,451,470 B2 | 11/2008 | Zimmerman |
| 7,461,061 B2 | 12/2008 | Aravamudan et al. |
| 7,487,151 B2 | 2/2009 | Yamamoto |
| 7,509,313 B2 | 3/2009 | Colledge et al. |
| 7,529,741 B2 | 5/2009 | Aravamudan et al. |
| 7,529,744 B1 | 5/2009 | Srivastava et al. |
| 7,536,384 B2 | 5/2009 | Venkataraman et al. |
| 7,536,854 B2 | 5/2009 | Da-Silva et al. |
| 7,539,676 B2 | 5/2009 | Aravamudan et al. |
| 7,548,915 B2 | 6/2009 | Ramer et al. |
| 7,594,244 B2 | 9/2009 | Scholl et al. |
| 7,644,054 B2 | 1/2010 | Garg et al. |
| 7,657,526 B2 | 2/2010 | Aravamudan et al. |
| 7,679,534 B2 | 3/2010 | Kay et al. |
| 7,680,882 B2 | 3/2010 | Tiu, Jr. et al. |
| 7,683,886 B2 | 3/2010 | Willey |
| 7,685,197 B2 | 3/2010 | Fain et al. |
| 7,712,053 B2 | 5/2010 | Bradford et al. |
| 7,725,485 B1 | 5/2010 | Sahami et al. |
| 7,725,486 B2 | 5/2010 | Tsuzuki et al. |
| 7,739,280 B2 | 6/2010 | Aravamudan et al. |
| 7,756,895 B1 | 7/2010 | Emigh |
| 7,757,250 B1 | 7/2010 | Horvitz et al. |
| 7,774,294 B2 | 8/2010 | Aravamudan et al. |
| 7,774,341 B2 | 8/2010 | Aravamudan et al. |
| 7,779,011 B2 | 8/2010 | Venkataraman et al. |
| 7,788,266 B2 | 8/2010 | Venkataraman et al. |
| 7,792,815 B2 | 9/2010 | Aravamudan et al. |
| 7,835,998 B2 | 11/2010 | Aravamudan et al. |
| 7,904,924 B1 | 3/2011 | de Heer et al. |
| 8,046,801 B2 | 10/2011 | Ellis et al. |
| 8,107,397 B1 | 1/2012 | Bagchi et al. |
| 8,527,510 B2 * | 9/2013 | Chen ................ G06Q 10/1053 707/736 |
| 2002/0042791 A1 | 4/2002 | Smith et al. |
| 2002/0052873 A1 | 5/2002 | Delgado et al. |
| 2002/0083448 A1 | 6/2002 | Johnson |
| 2002/0133481 A1 | 9/2002 | Smith et al. |
| 2003/0011573 A1 | 1/2003 | Villet et al. |
| 2003/0014753 A1 | 1/2003 | Beach et al. |
| 2003/0023976 A1 | 1/2003 | Kamen et al. |
| 2003/0037043 A1 | 2/2003 | Chang et al. |
| 2003/0046698 A1 | 3/2003 | Kamen et al. |
| 2003/0055894 A1 | 3/2003 | Yeager et al. |
| 2003/0066079 A1 | 4/2003 | Suga |
| 2003/0217121 A1 | 11/2003 | Willis |
| 2003/0226146 A1 | 12/2003 | Thurston et al. |
| 2003/0229900 A1 | 12/2003 | Reisman |
| 2003/0237096 A1 | 12/2003 | Barrett et al. |
| 2004/0013909 A1 | 1/2004 | Shimizu et al. |
| 2004/0021691 A1 | 2/2004 | Dostie et al. |
| 2004/0024777 A1 | 2/2004 | Schaffer |
| 2004/0034652 A1 | 2/2004 | Hofmann et al. |
| 2004/0046744 A1 | 3/2004 | Rafii et al. |
| 2004/0049783 A1 | 3/2004 | Lemmons et al. |
| 2004/0054520 A1 | 3/2004 | Dehlinger et al. |
| 2004/0073432 A1 | 4/2004 | Stone |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0103434 A1 | 5/2004 | Ellis |
| 2004/0111745 A1 | 6/2004 | Schein et al. |
| 2004/0128686 A1 | 7/2004 | Boyer et al. |
| 2004/0139091 A1 | 7/2004 | Shin |
| 2004/0143569 A1 | 7/2004 | Gross et al. |
| 2004/0155908 A1 | 8/2004 | Wagner |
| 2004/0163032 A1 | 8/2004 | Guo et al. |
| 2004/0194141 A1 | 9/2004 | Sanders |
| 2004/0205065 A1 | 10/2004 | Petras et al. |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0231003 A1 | 11/2004 | Cooper et al. |
| 2004/0254911 A1 | 12/2004 | Grasso et al. |
| 2004/0260574 A1 | 12/2004 | Gross |
| 2004/0261021 A1 | 12/2004 | Mittal et al. |
| 2005/0015366 A1 | 1/2005 | Carrasco et al. |
| 2005/0038702 A1 | 2/2005 | Merriman et al. |
| 2005/0060743 A1 | 3/2005 | Ohnuma et al. |
| 2005/0071874 A1 | 3/2005 | Elcock et al. |
| 2005/0079895 A1 | 4/2005 | Kalenius et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0097170 A1 | 5/2005 | Zhu et al. |
| 2005/0125307 A1 | 6/2005 | Hunt et al. |
| 2005/0129199 A1 | 6/2005 | Abe |
| 2005/0160458 A1 | 7/2005 | Baumgartner |
| 2005/0174333 A1 | 8/2005 | Robinson et al. |
| 2005/0187945 A1 | 8/2005 | Ehrich et al. |
| 2005/0192944 A1 | 9/2005 | Flinchem |
| 2005/0204388 A1 | 9/2005 | Knudson et al. |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0246324 A1 | 11/2005 | Paalasmaa et al. |
| 2005/0251827 A1 | 11/2005 | Ellis et al. |
| 2005/0256756 A1 | 11/2005 | Lam et al. |
| 2005/0262542 A1 | 11/2005 | DeWeese et al. |
| 2005/0267994 A1 | 12/2005 | Wong et al. |
| 2005/0273812 A1 | 12/2005 | Sakai |
| 2005/0278175 A1 | 12/2005 | Hyvonen |
| 2005/0283468 A1 | 12/2005 | Kamvar et al. |
| 2006/0004892 A1 | 1/2006 | Lunt et al. |
| 2006/0010477 A1 | 1/2006 | Yu |
| 2006/0010478 A1 | 1/2006 | White et al. |
| 2006/0010503 A1 | 1/2006 | Inoue et al. |
| 2006/0013487 A1 | 1/2006 | Longe et al. |
| 2006/0015588 A1 * | 1/2006 | Achlioptas ............ G06Q 10/107 709/220 |
| 2006/0015906 A1 | 1/2006 | Boyer et al. |
| 2006/0020662 A1 | 1/2006 | Robinson |
| 2006/0036640 A1 | 2/2006 | Tateno et al. |
| 2006/0041843 A1 | 2/2006 | Billsus et al. |
| 2006/0044277 A1 | 3/2006 | Fux et al. |
| 2006/0053449 A1 | 3/2006 | Gutta |
| 2006/0059044 A1 | 3/2006 | Chan et al. |
| 2006/0069616 A1 | 3/2006 | Bau |
| 2006/0075429 A1 | 4/2006 | Istvan et al. |
| 2006/0090182 A1 | 4/2006 | Horowitz et al. |
| 2006/0090185 A1 | 4/2006 | Zito et al. |
| 2006/0090812 A1 | 5/2006 | Summerville |
| 2006/0098899 A1 | 5/2006 | King et al. |
| 2006/0101499 A1 | 5/2006 | Aravamudan et al. |
| 2006/0101503 A1 | 5/2006 | Venkataraman et al. |
| 2006/0101504 A1 | 5/2006 | Aravamudan et al. |
| 2006/0106782 A1 | 5/2006 | Blumenau et al. |
| 2006/0112162 A1 | 5/2006 | Marot et al. |
| 2006/0117019 A1 | 6/2006 | Sylthe et al. |
| 2006/0136379 A1 | 6/2006 | Marino et al. |
| 2006/0150216 A1 | 7/2006 | Herz et al. |
| 2006/0156233 A1 | 7/2006 | Nurmi |
| 2006/0161520 A1 | 7/2006 | Brewer et al. |
| 2006/0163337 A1 | 7/2006 | Unruh |
| 2006/0167676 A1 | 7/2006 | Plumb |
| 2006/0167859 A1 | 7/2006 | Verbeck Sibley et al. |
| 2006/0173818 A1 | 8/2006 | Berstis et al. |
| 2006/0176283 A1 | 8/2006 | Suraqui |
| 2006/0184989 A1 | 8/2006 | Slothouber |
| 2006/0190308 A1 | 8/2006 | Janssens et al. |
| 2006/0190966 A1 | 8/2006 | McKissick et al. |
| 2006/0195435 A1 | 8/2006 | Laird-McConnell et al. |
| 2006/0206454 A1 | 9/2006 | Forstall et al. |
| 2006/0206815 A1 | 9/2006 | Pathiyal et al. |
| 2006/0242178 A1 | 10/2006 | Butterfield et al. |
| 2006/0242607 A1 | 10/2006 | Hudson |
| 2006/0248078 A1 | 11/2006 | Gross et al. |

(56) References Cited

U.S. PATENT DOCUMENTS

| | | | |
|---|---|---|---|
| 2006/0248573 A1 | 11/2006 | Pannu et al. | |
| 2006/0256070 A1 | 11/2006 | Moosavi et al. | |
| 2006/0256078 A1 | 11/2006 | Flinchem et al. | |
| 2006/0259344 A1 | 11/2006 | Patel et al. | |
| 2006/0259479 A1 | 11/2006 | Dai | |
| 2006/0261021 A1 | 11/2006 | Stagnaro | |
| 2006/0271552 A1 | 11/2006 | McChesney et al. | |
| 2006/0271959 A1 | 11/2006 | Jacoby et al. | |
| 2006/0274051 A1 | 12/2006 | Longe et al. | |
| 2006/0282856 A1 | 12/2006 | Errico et al. | |
| 2006/0285665 A1* | 12/2006 | Wasserblat | G10L 17/26 379/114.14 |
| 2007/0005526 A1 | 1/2007 | Whitney et al. | |
| 2007/0005563 A1 | 1/2007 | Aravamudan et al. | |
| 2007/0005576 A1 | 1/2007 | Cutrell et al. | |
| 2007/0016476 A1 | 1/2007 | Hoffberg et al. | |
| 2007/0016862 A1 | 1/2007 | Kuzmin | |
| 2007/0027852 A1 | 2/2007 | Howard et al. | |
| 2007/0027861 A1 | 2/2007 | Huentelman et al. | |
| 2007/0027871 A1 | 2/2007 | Arbajian | |
| 2007/0043750 A1 | 2/2007 | Dingle | |
| 2007/0044122 A1 | 2/2007 | Scholl et al. | |
| 2007/0050337 A1 | 3/2007 | Venkataraman et al. | |
| 2007/0050348 A1 | 3/2007 | Aharoni et al. | |
| 2007/0061244 A1 | 3/2007 | Ramer et al. | |
| 2007/0061317 A1 | 3/2007 | Ramer et al. | |
| 2007/0061321 A1 | 3/2007 | Venkataraman et al. | |
| 2007/0061753 A1 | 3/2007 | Ng et al. | |
| 2007/0061754 A1 | 3/2007 | Ardhanari et al. | |
| 2007/0064626 A1 | 3/2007 | Evans | |
| 2007/0067272 A1 | 3/2007 | Flynt et al. | |
| 2007/0074131 A1 | 3/2007 | Assadollahi | |
| 2007/0088681 A1 | 4/2007 | Aravamudan et al. | |
| 2007/0094024 A1 | 4/2007 | Kristensson et al. | |
| 2007/0100650 A1 | 5/2007 | Ramer et al. | |
| 2007/0121843 A1 | 5/2007 | Atazky et al. | |
| 2007/0130128 A1 | 6/2007 | Garg et al. | |
| 2007/0136745 A1 | 6/2007 | Garbow et al. | |
| 2007/0143567 A1 | 6/2007 | Gorobets | |
| 2007/0150606 A1 | 6/2007 | Flinchem et al. | |
| 2007/0157242 A1 | 7/2007 | Cordray et al. | |
| 2007/0168544 A1 | 7/2007 | Sciammarella | |
| 2007/0174249 A1 | 7/2007 | James | |
| 2007/0182595 A1 | 8/2007 | Ghasabian | |
| 2007/0186242 A1 | 8/2007 | Price et al. | |
| 2007/0199025 A1 | 8/2007 | Angiolillo et al. | |
| 2007/0208613 A1 | 9/2007 | Backer | |
| 2007/0208718 A1 | 9/2007 | Javid et al. | |
| 2007/0214162 A1 | 9/2007 | Rice | |
| 2007/0219984 A1 | 9/2007 | Aravamudan et al. | |
| 2007/0219985 A1 | 9/2007 | Aravamudan et al. | |
| 2007/0226649 A1 | 9/2007 | Agmon | |
| 2007/0240045 A1 | 10/2007 | Fux et al. | |
| 2007/0242178 A1 | 10/2007 | Kawasaki et al. | |
| 2007/0250866 A1 | 10/2007 | Yamada | |
| 2007/0255693 A1 | 11/2007 | Ramaswamy et al. | |
| 2007/0256070 A1 | 11/2007 | Bykov et al. | |
| 2007/0260703 A1 | 11/2007 | Ardhanari et al. | |
| 2007/0266021 A1 | 11/2007 | Aravamudan et al. | |
| 2007/0266026 A1 | 11/2007 | Aravamudan et al. | |
| 2007/0266406 A1 | 11/2007 | Aravamudan et al. | |
| 2007/0271205 A1 | 11/2007 | Aravamudan et al. | |
| 2007/0276773 A1 | 11/2007 | Aravamudan et al. | |
| 2007/0276821 A1 | 11/2007 | Aravamudan et al. | |
| 2007/0276859 A1 | 11/2007 | Aravamudan et al. | |
| 2007/0288456 A1 | 12/2007 | Aravamudan et al. | |
| 2007/0288457 A1 | 12/2007 | Aravamudan et al. | |
| 2008/0016240 A1 | 1/2008 | Balandin | |
| 2008/0065617 A1 | 3/2008 | Burke et al. | |
| 2008/0071771 A1 | 3/2008 | Venkataraman et al. | |
| 2008/0077577 A1 | 3/2008 | Byrne et al. | |
| 2008/0086704 A1 | 4/2008 | Aravamudan | |
| 2008/0109401 A1 | 5/2008 | Sareen et al. | |
| 2008/0114743 A1 | 5/2008 | Venkataraman et al. | |
| 2008/0134043 A1 | 6/2008 | Georgis et al. | |
| 2008/0147711 A1 | 6/2008 | Spiegelman | |
| 2008/0177717 A1 | 7/2008 | Kumar et al. | |
| 2008/0195601 A1 | 8/2008 | Ntoulas et al. | |
| 2008/0209229 A1 | 8/2008 | Ramakrishnan et al. | |
| 2008/0255977 A1 | 10/2008 | Altberg et al. | |
| 2008/0275719 A1 | 11/2008 | Davis et al. | |
| 2008/0301732 A1 | 12/2008 | Archer et al. | |
| 2008/0313564 A1 | 12/2008 | Barve et al. | |
| 2009/0077496 A1 | 3/2009 | Aravamudan et al. | |
| 2009/0112989 A1 | 4/2009 | Anderson et al. | |
| 2009/0133070 A1 | 5/2009 | Hamano et al. | |
| 2009/0151002 A1 | 6/2009 | Zuniga et al. | |
| 2009/0164263 A1 | 6/2009 | Marlow et al. | |
| 2009/0198688 A1 | 8/2009 | Venkataraman et al. | |
| 2009/0217203 A1 | 8/2009 | Aravamudan et al. | |
| 2009/0271358 A1 | 10/2009 | Lindahl et al. | |
| 2010/0030578 A1 | 2/2010 | Siddique et al. | |
| 2010/0030638 A1 | 2/2010 | Davis, III et al. | |
| 2010/0121845 A1 | 5/2010 | Aravamudan et al. | |
| 2010/0153380 A1 | 6/2010 | Garg et al. | |
| 2010/0241625 A1 | 9/2010 | Aravamudan et al. | |
| 2010/0293160 A1 | 11/2010 | Aravamudan et al. | |
| 2010/0306194 A1 | 12/2010 | Evans | |
| 2010/0325111 A1 | 12/2010 | Aravamudan et al. | |
| 2011/0043652 A1 | 2/2011 | King et al. | |
| 2011/0047213 A1 | 2/2011 | Manuel | |
| 2011/0076994 A1 | 3/2011 | Kim et al. | |
| 2011/0113249 A1 | 5/2011 | Gelbard et al. | |
| 2011/0137789 A1 | 6/2011 | Kortina et al. | |
| 2011/0179081 A1 | 7/2011 | Ovsjanikov et al. | |
| 2011/0214148 A1 | 9/2011 | Gossweiler, III et al. | |
| 2012/0042386 A1 | 2/2012 | Backer | |
| 2012/0221505 A1 | 8/2012 | Evans et al. | |
| 2012/0226761 A1 | 9/2012 | Emigh et al. | |
| 2014/0016872 A1* | 1/2014 | Chao | G06K 9/622 382/218 |

FOREIGN PATENT DOCUMENTS

| | | |
|---|---|---|
| JP | 2003/250146 A | 9/2003 |
| JP | 2004254077 A | 9/2004 |
| JP | 2005/505070 A | 2/2005 |
| JP | 2005520268 A | 7/2005 |
| JP | 2005275740 | 10/2005 |
| JP | 2006024212 A | 1/2006 |
| JP | 2006/510270 A | 3/2006 |
| JP | 2007/158925 A | 6/2007 |
| JP | 2007/274605 A | 10/2007 |
| JP | 2009534761 A | 9/2009 |
| JP | 2010-503931 A | 2/2010 |
| WO | WO-19940014284 A1 | 6/1994 |
| WO | WO-98/56173 A1 | 12/1998 |
| WO | WO-200054264 A1 | 9/2000 |
| WO | WO-200070505 A1 | 11/2000 |
| WO | WO-2001046843 A2 | 6/2001 |
| WO | WO-01/93096 A2 | 12/2001 |
| WO | WO 02/082814 | 10/2002 |
| WO | WO-2003/030528 A2 | 4/2003 |
| WO | WO-2004010326 A1 | 1/2004 |
| WO | WO-2004031931 A1 | 4/2004 |
| WO | WO-2004/054264 A1 | 6/2004 |
| WO | WO-2004052010 A1 | 6/2004 |
| WO | WO-2005033967 A2 | 4/2005 |
| WO | WO-2005054982 | 6/2005 |
| WO | WO-2005084235 A2 | 9/2005 |
| WO | WO-2006/052966 A2 | 5/2006 |
| WO | WO-2006052959 A2 | 5/2006 |
| WO | WO-2006/074305 A2 | 7/2006 |
| WO | WO-2007/025148 A2 | 3/2007 |
| WO | WO-2007/025149 A2 | 3/2007 |
| WO | WO-2007/062035 A2 | 5/2007 |
| WO | WO-2007/118038 A2 | 10/2007 |
| WO | WO-2007/124429 A2 | 11/2007 |
| WO | WO-2007124436 A2 | 11/2007 |
| WO | WO-2007131058 A2 | 11/2007 |
| WO | WO-2008034057 A2 | 3/2008 |
| WO | WO-2008091941 A2 | 7/2008 |

(56) References Cited

FOREIGN PATENT DOCUMENTS

| WO | WO-2008063987 | | 8/2008 |
|---|---|---|---|
| WO | WO-2008148012 | A1 | 12/2008 |
| WO | WO-2009070193 | A2 | 6/2009 |

OTHER PUBLICATIONS

U.S. Appl. No. 09/332,244, filed Jun. 11, 1999, Ellis et al.
U.S. Appl. No. 11/324,202, filed Dec. 29, 2005, Yates, et al.
U.S. Appl. No. 11/412,549, filed Apr. 27, 2006, Ellis et al.
U.S. Appl. No. 11/541,299, filed Sep. 29, 2006, Shannon et al.
U.S. Appl. No. 60/548,589, filed Feb. 27, 2004, Flinchem et al.
U.S. Appl. No. 11/324,202, filed Dec. 29, 2005, Yates.
A Model of a Trust-Based Recommendation System on a Social Network—Published Date: Oct. 18, 2007.
C. de Kerchove and P. Dooren. The PageTrust Algorithm: how to rank web pages when negative links are allowed? In Proc. SIAM Int. Conf. on Data Mining, pp. 346352, 2008.
Computing and Applying Trust in Web-Based Social Networks—Published Date: Apr. 11, 2005 htto://test.lib.umd.edu/drum/bitstream/1903/2384/1/umi-umd-2244.pdf.
International Search Report and Written Opinion, International Application No. PCT/US06/25249, dated Jan. 29, 2008 (7 pages).
International Search Report and Written Opinion, International Application No. PCT/US06/33204, dated Sep. 21, 2007 (6 pages).
International Search Reportand Written Opinion, InternationalApplication No. PCT/US06/40005, dated Jul. 3, 2007 (8 pages).
International Search Report and Written Opinion, International Application No. PCT/US07/65703, dated Jan. 25, 2008 (5 pages).
International Search Report and Written Opinion, International Application No. PCT/US07/67100, dated Mar. 7, 2008 (6 pages).
International Search Report, International Patent Application No. PCT/US07/67114, dated Jul. 2, 2008 (6 pages).
International Search Report dated May 28, 2009, Application No. PCT/US2008/0011646 (4 pages) (now WO 2009/070193 ).
J. Kunegis, A. Lornrnatzsch, and C. Bauckhage. The slashdot zoo: mining a social network with negative edges. In WWW '09: Proceedings ofthe 18th international conference on World wide web, pp. 741-750, 2009.
L. Page, S. Brin, R. Motwani, and T. Winograd. The pagerank citation ranking: Bringing order to the web. Technical Report, Stanford University, 1998.
Office Action dated Jul. 21, 2010 in U.S. Appl. No. 11/986,461.
Office Action dated Jul. 8, 2010 in U.S. Appl. No. 11/986,463.
Guha, R., et al, "Propagation of Trust and Distrust" , WWW2004, May 17-22, 2004, pp. 403-412.
S. Kamvar, M. Schlosser, and H. Garcia-Molina. The EigenTrust algorithm for reputation management in P2P networks. In Proc. Int. Conf. on World Wide Web, pp. 640-651, 2003.
Trust- and Distrust-Based Recommendations for Controversial Reviews—Published Date: 2009.
Trust-Based Recommendations for Publications—A Multi-Layer Network Approach—Published Date: 2006 httQ://www.uni-bamberg.de/fileadmin/uni/fakultaeten/wiailehrstuehle/kulturinformatik!Publikationen/Hess Trust Based Recommendations for Publications—A Multi-Layer Network Aooroach.pdf.
Trust-Based Recommendation Systems: An Axiomatic Approach—Published Date: Apr. 21-25, 2008.
Ardissono, L. et al., "User Modeling and Recommendation Techniques for Personalized Electronic Program Guides," Personalized Digital Television, Editors: Ardissono, et al., Kluwer Academic Press, 2004 (27 pages).
Benes, V.E., "Mathematical Theory of Connecting Networks and Telephone Traffic," Academic Press, NY, 1965 (4 pages).
Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu.fi/nodalida/abstracts/03.shtml, 3 pages.

Digital Video Broadcasting, http://www.dvb.org (Oct. 12, 2007) (2 pages).
Duff, I.S. et al., "Direct Methods for Sparse Matrices," Monographs on Numerical Analysis, Oxford Science Publications, Clarendon Press, Oxford, 1986 (7 pages).
GADD, Phonix: The Algorith, Program, vol. 24(4), Oct. 1990 (pp. 363-369).
Garey, M.R. et al., "Computers and Intractability a Guide to the Theory of NP-Completeness," W.H. Freeman and Co., New York, 1979 (2 pages).
Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.
International Search and Written Opinion issued by the U.S. Patent and Trademark Office as the International Searching Authority for International Application No. PCT/US2005/040415, dated Nov. 27, 2006, 6 pages.
International Search and Written Opinion issued by the U.S. Patent and Trademark Office as the International Searching Authority for International Application No. PCT/US2005/040424, dated Nov. 21, 2006, 6 pages.
International Search and Written Opinion issued by the U.S. Patent and Trademark Office as the International Searching Authority for International Application No. PCT/US2005/040517, dated Jun. 13, 2008, 4 pages.
International Search and Written Opinion issued by the U.S. Patent and Trademark Office as the International Searching Authority for International Application No. PCT/US2006/025249, dated Jan. 29, 2008, 6 pages.
International Search and Written Opinion issued by the U.S. Patent and Trademark Office as the International Searching Authority for International Application No. PCT/US2006/033204, dated Sep. 21, 2007, 8 pages.
International Search and Written Opinion issued by the U.S. Patent and Trademark Office as the International Searching Authority for International Application No. PCT/US2006/033257, dated Mar. 26, 2008, 5 pages.
International Search and Written Opinion issued by the U.S. Patent and Trademark Office as the International Searching Authority for International Application No. PCT/US2006/033258, dated Mar. 26, 2008 (6 pages).
International Search and Written Opinion issued by the U.S. Patent and Trademark Office as the International Searching Authority for International Application No. PCT/US2006/040005 dated Jul. 3, 2007 (8 pages).
International Search and Written Opinion issued by the U.S. Patent and Trademark Office as the International Searching Authority for International Application No. PCT/US2007/065703 dated Jan. 25, 2008 (5 pages).
International Search and Written Opinion issued by the U.S. Patent and Trademark Office as the International Searching Authority for International Application No. PCT/US2007/067100, dated Mar. 7, 2008 (5 pages).
International Search and Written Opinion issued by the U.S. Patent and Trademark Office as the International Searching Authority for International Application No. PCT/US2007/067114, dated Jul. 2, 2008, 6 pages.
International Search and Written Opinion issued by the U.S. Patent and Trademark Office as the International Searching Authority for International Application No. PCT/US2007/068064, dated Jul. 7, 2008, 9 pages.
International Search and Written Opinion issued by the U.S. Patent and Trademark Office as the International Searching Authority for International Application No. PCT/US2007/084500, dated May 20, 2008, 6 pages.
International Search and Written Opinion issued by the U.S. Patent and Trademark Office as the International Searching Authority for International Application No. PCT/US2008/051789, dated Jul. 14, 2008 (7 Pages).

(56) References Cited

OTHER PUBLICATIONS

International Search and Written Opinion issued by the U.S. Patent and Trademark Office as the International Searching Authority for International Application No. PCT/US2008/064730, dated Sep. 8, 2008, 5 pages.
International Search and Written Opinion issued by the U.S. Patent and Trademark Office as the International Searching Authority for International Application No. PCT/US2012/034780, dated Jul. 16, 2012 (2 pages).
International Search and Written Opinion issued by the U.S. Patent and Trademark Office as the International Searching Authority for International Application No. PCT/US2006/045053, dated Jul. 24, 2004 (10 pages).
International Search and Written Opinion issued by the U.S. Patent and Trademark Office as the International Searching Authority for International Application No. PCT/US2007/078490, dated Jul. 3, 2008 (6 pages).
J. Kleinberg, Authoritative sources in a hyperlinked environment. Journal of the ACM (JACM) 46(5):604-632, 1999.
Kurapati, et al., "A Multi-Agent TV Recommender," In Proceedings of the UM 2001Workshop "Personalization in Future TV," 2001, 8 pages.
Lindgren, B.W. et al., "Introduction to Probability and Statistics," MacMillan Publishing Co., New York, New York, 1978 (23 pages).
Luenberger, D.G., "Linear and Nonlinear Pogramming," Second Ed., Addison-Wesley Publishing Company, Reading, MA, 1989 (51 pages).
Mackenzie et al. "Letterwise: Prefix-Based Disambiguation for Mobile Text Input, Proceedings of the ACM Symposium on User Interface Software and Technology—UIST 2001" (pp. 111-120).
Matthom, "Text Highlighting in Search Results", Jul. 22, 2005. Retrieved from www.matthom.com/archive/2005/01/22/text-highlighting-in-search-results on Jun. 23, 2006 (4 pages).
Mokotoff, Soundexing and Genealogy, Retrieved from www.avotaynu.com/soundex.html on Mar. 19, 2008, last updated Sep. 8, 2007 (6 pages).
Murray et al., "Inferring Demographic Attributes of Anonymous Internet Users," WEBKDD '99 LNAI, 1836, pp. 7-20, 2000.
Nardi, et al., "Integrating Communication and Information Through Contact Map," Communications of the ACM, vol. 45, No.4, Apr. 2002, 7 pages, retrieved from URL:http://portal.acm.org/citation.cfm?id+505251.
Nemhauser, G.L. et al., "Integer and Combinational Optimization," John Wiley and Sons, New York, 1988 (2 pages).
Office Action for U.S. Appl. No. 11/204,546 dated Sep. 17, 2009, 34 pages.
Office Action for U.S. Appl. No. 11/204,546 dated Jul. 8, 2008, 30 pages.
Office Action for U.S. Appl. No. 11/204,546 dated Mar. 3, 2009, 26 pages.
Press Release from Tegic Communications, "Tegic Communications is awarded patent for Japanese T9(R) text input software from the Japan Patent Office," Oct. 12, 2004. Retrieved Nov. 18, 2005 from http://www.tegic.com/press view.html?release num=55254242 (4 pages).
Review of Personalization Technologies: Collaborative Filtering vs. ChoiceStream's Attributized Bayesian Choice Modeling, Technology Brief, ChoiceStream Technologies, Cambridge, MA, Feb. 2004, 13 pages.
Roe, et al., "Mapping UML Models Incorporating OCL Constraints into Object-Z," Technical Report, Sep. 2003, Department of Computing, Imperial College London, retrieved on Jul. 12, 2007 (17 pages).
Silfverberg et al. "Predicting Text Entry Speed on Mobile Phones." Proceedings of the ACM Conference on Human Factors in Computing Systems—CHI 2000. (pp. 9-16).
Supplemental European Search Report and Written Opinion for EP05826129.8, dated Aug. 11, 2009, 15 pages.
Supplemental European Search Report and Written Opinion for EP06838179.7, dated Dec. 9, 2009, 7 pages.
Supplemental European Search Report and Written Opinion for EP07761026.9 dated Jan. 28, 2010, 8 pages.
Supplemental European Search Report and Written Opinion for EP07842499, dated Aug. 26, 2010, 6 pages.
Supplemental Partial European Search Report for EP05826114.0 dated Aug. 20, 2009, 13 pages.
Talbot, David. "Soul of a New Mobile Machine." Technology Review May/Jun. 2007. (pp. 46-53).
Turski, et al., "Inner Circle—People Centered Email Client," CHI 2005 Conference on Human Factors in Computing Sysems, Apr. 2005, pp. 1845-1848, 4 pages, retrieved from URL:http://portal.acm.org/citation.cfm?id+1056808.1057037.
Villani, et al., Keystroke Biometric Recognition Studies on Long-Text Input under Ideal and Application-Oriented Conditions, Proceedings of StudenUFaculty Research Day, CSIS, Pace University, May, 2006, pp. C3.1-C3.8.
Wikipedia's entry for Levenshtein distance (n.d.). Retrieved Nov. 15, 2006 from http://en.wikipedia.org/wiki/Levenshtein distance (9 pages).
Written Opinion of the International Searching Authority, International Application No. PCT/US06/25249, dated Jan. 29, 2008 (4 pages) Combined With ISR to Make One Document (Apr. 27, 2015).
Written Opinion of the International Searching Authority, International Application No. PCT/US06/33204, dated Sep. 21, 2007 (3 pages). Combined With ISR to Make One Document (Apr. 27, 2015).
Written Opinion of the International Searching Authority, International Application No. PCT/US06/40005, dated Jul. 3, 2007 (4 pages). Combined With ISR to Make One Document (Apr. 27, 2015).
Written Opinion of the International Searching Authority, International Application No. PCT/US07/65703, dated Jan. 25, 2008 (4 pages). Combined With ISR to Make One Document (Apr. 27, 2015).
Written Opinion of the International Searching Authority, International Application No. PCT/US07/67100, dated Mar. 7, 2008 (3 pages). Combined With ISR to Make One Document (Apr. 27, 2015).
Zimmerman, et al., "TV Personalization System Design of a TV Show Recommender Engine and Interface," In Liliana Ardissono, Alfred Kobsa, Mark Maybury (eds) Personalized Digital Television: Targeting Programs to Individual Viewers, Kluwer: 27-52; 2004, 29 pages.

* cited by examiner

USER INTERFACE METHODS AND SYSTEMS FOR SELECTING AND PRESENTING CONTENT BASED ON USER RELATIONSHIPS

CROSS-REFERENCE TO RELATED APPLICATIONS

This application is a continuation of prior U.S. patent application Ser. No. 14/175,189, filed on Feb. 7, 2014, entitled User Interface Methods and Systems for Selecting and Presenting Content Based on User Relationships, currently allowed, which is a continuation of prior U.S. patent application Ser. No. 13/765,335, filed on Feb. 12, 2013, entitled User Interface Methods and Systems For Selecting and Presenting Content Based On User Relationships, now U.S. Pat. No. 8,688,746, which is a continuation of prior U.S. patent application Ser. No. 13/479,820, filed on May 24, 2012, entitled User Interface Methods and Systems For Selecting and Presenting Content Based On User Relationships, now U.S. Pat. No. 8,423,583, which is a continuation of prior U.S. patent application Ser. No. 13/336,660, filed on Dec. 23, 2011, entitled User Interface Methods and Systems For Selecting and Presenting Content Based On User Navigation and Selection Actions Associated With The Content, now U.S. Pat. No. 8,375,069, which is a continuation of U.S. patent application Ser. No. 13/034,034, filed on Feb. 24, 2011, entitled User Interface Methods and Systems For Selecting and Presenting Content Based On User Navigation and Selection Actions Associated With The Content, now U.S. Pat. No. 8,086,602, which is a continuation of prior U.S. patent application Ser. No. 12/326,485 filed on Dec. 2, 2008, entitled User Interface Methods and Systems For Selecting and Presenting Content Based On User Navigation and Selection Actions Associated With The Content, now U.S. Pat. No. 7,899,806, which is a continuation of U.S. patent application Ser. No. 11/738,101 filed on Apr. 20, 2007, entitled User Interface Methods and Systems For Selecting and Presenting Content Based On User Navigation and Selection Actions Associated With The Content, now U.S. Pat. No. 7,461,061, which claims the benefit under 35 U.S.C. § 119(e) of U.S. Provisional Application No. 60/793,537, entitled A System and Method for Personalized Navigation and Discovery of Information on Input and Display Constrained Devices, filed Apr. 20, 2006, and U.S. Provisional Application No. 60/793,540, entitled A System and Method for Personalized Navigation and Discovery of Information Utilizing Users Relationship to the Information Hierarchy on Input and Display Constrained Devices, filed Apr. 20, 2006, the contents of all of which are incorporated by reference herein.

This application is related to U.S. patent application Ser. No. 11/738,138, entitled User Interface Methods and Systems For Selecting and Presenting Content Based On Relationships Between the User and Other Members of An Organization, filed Apr. 20, 2007, now U.S. Pat. No. 7,539,676.

BACKGROUND

Field of Invention

This invention generally relates to learning the behavior of a user navigating and selecting content on input and display constrained devices. More specifically, the invention relates to using the learned navigation and selection behavior data to personalize the user's interactions with various service providers and content query systems, e.g., to better find results to queries provided by the user and to order the results for presentation to the user.

Description of Related Art

The acid test for the usability of an information finding system on input constrained and display constrained devices is the effort expended by the user in the discovery of desired information (the discovery of information could be text based search, browsing a content space, or some combination of both). The effort expended by the user is the number of steps involved in interacting with an information finding system to discover the desired information. Each click of a button, or a scroll motion, or the entry of a character, would be perceived by the user as expended effort. The success of any user interface may be determined by this metric.

Minimizing the effort expended to find information (be it search or browse) is a challenging problem on input and display constrained devices such as mobile phones and televisions. The method of discovery the user chooses may vary upon the application context and the user intent—for example, a user may, from past habit, browse through the phonebook to a contact to make a call (especially when the contact list is small), or perform text input when searching for a web site. Browse based navigation is typically used (and is effective) when the user's intent is broad. Furthermore it is a viable form of navigation only when the content space is not very large at any level of navigation of the content space hierarchy—only text-based search is effective for content spaces that are large. Any solution however, needs to solve the "minimal effort" problem for both these forms of discovery.

BRIEF SUMMARY

The invention provides methods and systems for selecting and presenting content based on learned user navigation and selection actions associated with the content.

Under another aspect of the invention, a user-interface method of selecting and presenting a collection of content items in which the presentation s ordered at least in part based on navigation and selection behavior of a user learned over time includes providing a set of content items where each content item has an associated relevance weight on a per user basis. The method also includes organizing the content items into groups based on the informational content of the content items, each group of content items having an associated relevance weight on a per user basis. The method further includes receiving from the user navigation and selection actions, adjusting the associated relevance weight of the selected content item. The method also includes, in response to subsequent input entered by the user, selecting and presenting a subset of content items and content groups to the user where the content items and content groups are ordered at least in part by the adjusted associated relevance weights assigned to the content items and content groups such that content items with greater associated relevance weights are presented as more relevant content items within a content group and groups of content items with greater associated relevance weights are presented as more relevant groups of content items.

Under further aspect of the invention, the context such as geographic location of the user, day, date, and time, in which the user performed the selection action is associated with the adjusted relevance weighting of content items and groups of content items. The adjusted relevance weighting of content items and groups of content items is only used in subsequent searches by the user when the search is performed in the same or similar context.

Under yet another aspect of the invention, the adjusted associated relevance weights are decayed as time passes from the act of adjusting the associated relevance weights.

Under yet another aspect of the invention, the adjusted associated relevance weights are decayed based upon the number of user selections occurring after the act of adjusting the associated relevance weights.

These and other features will become readily apparent from the following detailed description where embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
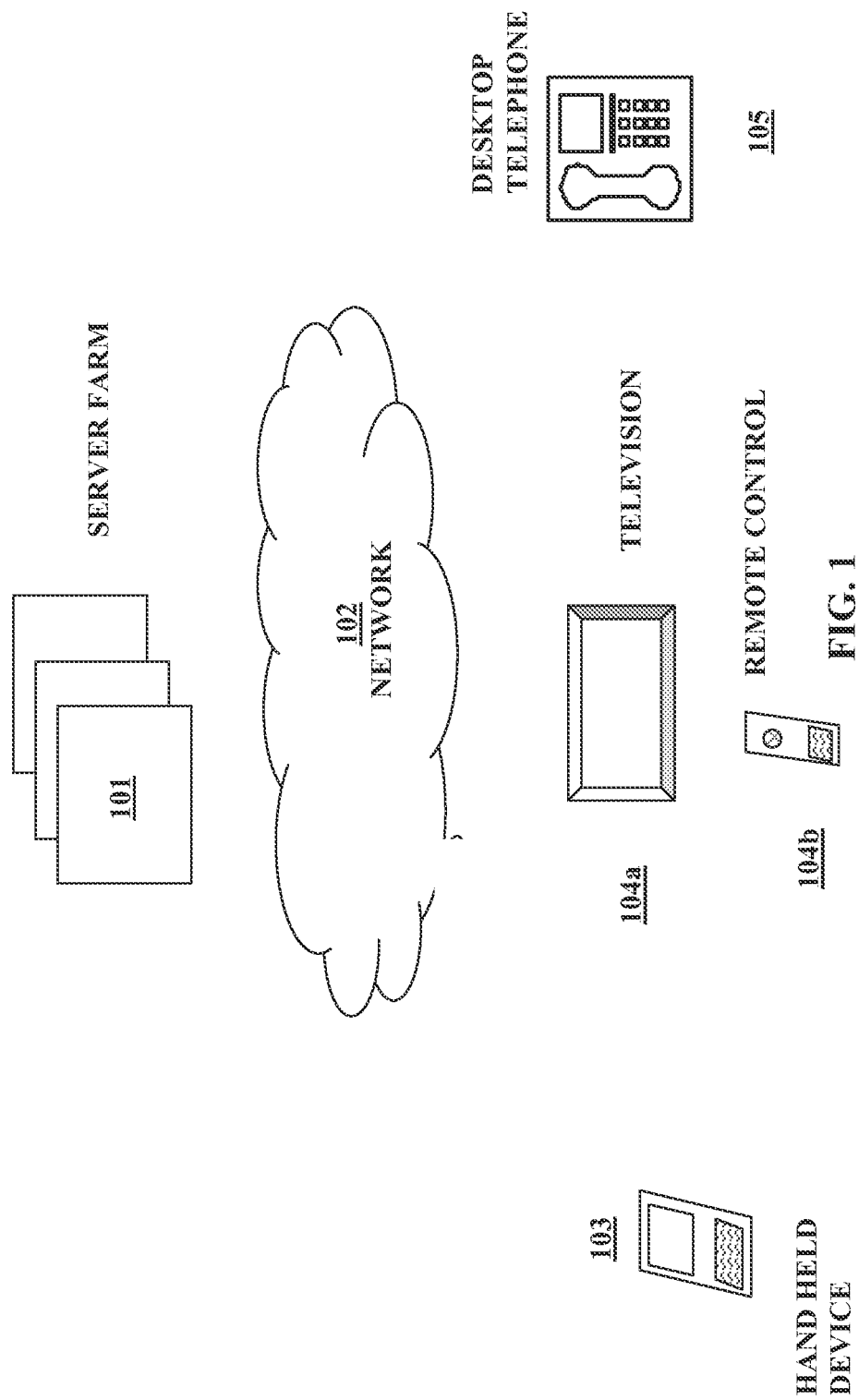
FIG. 1 illustrates a network based information navigation system in accordance with one or more embodiments of the invention.

The invention addresses the shortcomings of existing information navigation systems by taking a unified approach to the information finding process, be it search (incremental or full word search) or browse, and helps the user find information of interest by personalizing the information space to match the user's actions and exploiting the relationship of the user to the information space being navigated. A multi-pronged holistic approach of taking into account (1) what the user does with the device (user's intent) (2) when do these interactions happen (3) and where do these interactions happen, provides significant insights into achieving the goal of reducing device interactions, and thereby improving the user experience.

For text-input based discovery content, the key factors to reduce the effort involved in discovering information is to reduce the number of characters the user has to type in to discover the desired information and the number of browse navigations to reach the desired result once it appears on the screen. Incremental text search, combined with the right relevance ordering of results, is key to reducing the effort involved in discovering content through text-input based search. For browse based discovery of content, minimizing the number of navigations (navigating through folders and linear scroll) through the browse hierarchy is key.

Preferred embodiments of the invention capture user preferences, user information navigation behavior, and a user's relationship to an information hierarchy. The learned data is used to personalize the user's interaction with various service providers and the user's interaction with content query systems, e.g., to personalize the navigation and discovery of information by the user. In an illustrative embodiment, the user is searching a phonebook for an individual phone number. In another illustrative embodiment, the user is an employee searching a corporate hierarchy for superiors, peers, and subordinates.

Embodiments of the present invention build on techniques, systems and methods disclosed in earlier filed applications, including but not limited to U.S. patent application Ser. No. 11/136,261, entitled Method and System For Performing Searches For Television Programming Using Reduced Text Input, filed on May 24, 2005; U.S. patent application Ser. No. 11/246,432, entitled Method And System For Incremental Search With Reduced Text Entry Where The Relevance Of Results Is A Dynamically Computed Function of User Input Search String Character Count, filed on Oct. 7, 2005; U.S. patent application Ser. No. 11/235,928, entitled Method and System For Processing Ambiguous, Multiterm Search Queries, filed on Sep. 27, 2005; U.S. patent application Ser. No. 11/509,909, entitled User Interface For Visual Cooperation Between Text Input And Display Device, filed Aug. 25, 2006; and U.S. patent application Ser. No. 11/682,693, entitled Methods and Systems For Selecting and Presenting Content Based On Learned Periodicity Of User Content Selection, filed on Mar. 6, 2007; the contents of each of which are herein incorporated by reference. Those applications taught specific ways to perform incremental searches using ambiguous text input, methods of ordering the search results, and techniques for learning a user's behavior and preferences. The techniques disclosed in those applications can be used with the user's navigation behavior or the user's relationship to an information hierarchy described herein in the same or similar ways in which the techniques are applied to the collections of content items described in those applications. In such a case, the user's behavior or relationship described herein represents a particular type of content item. The present techniques, however, are not limited to systems and methods disclosed in the incorporated patent applications. Thus, while reference to such systems and applications may be helpful, it is not believed necessary to understand the present embodiments or inventions.

Referring to FIG. 1, an overall system for navigation of local and/or network resident information using a wide range of devices in accordance with one or more embodiments of the invention is illustrated. A server farm 101 serves as the source of navigation data and relevance updates with a network 102 functioning as the distribution framework. The distribution could be a combination of wired and wireless connections. The navigation devices could have a wide range of interface capabilities such as a hand-held device 103 (e.g. phone, PDA, or a music/video playback device) with limited display size and optionally an overloaded or small QWERTY keypad, a television 104a coupled with a remote 104b having an overloaded or small QWERTY keypad, or a desktop telephone 105 with limited display and input entry capabilities.

Figure 2:
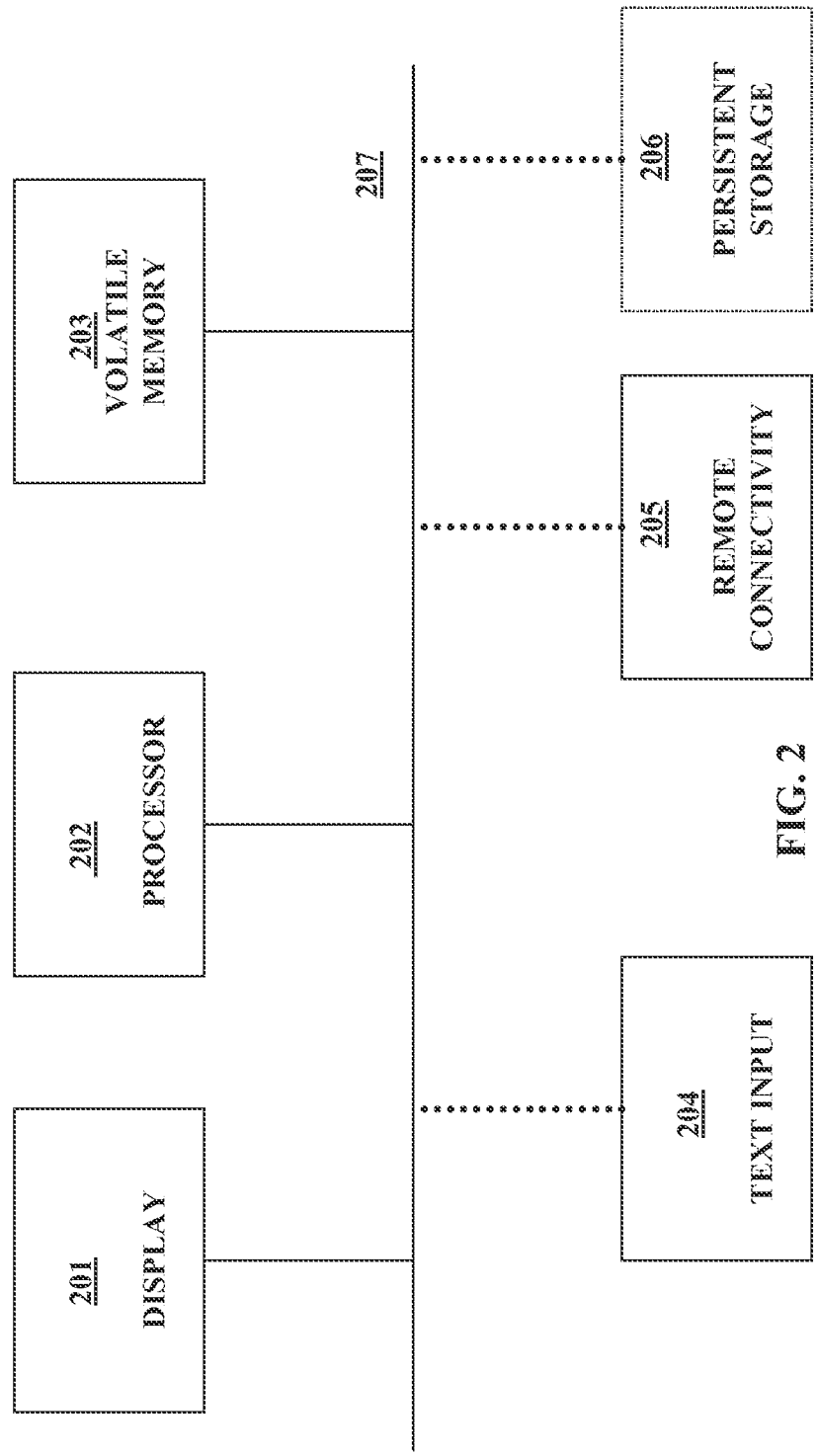
FIG. 2 illustrates device configuration options to perform navigation of locally or remotely resident information.

Referring to FIG. 2, multiple device configurations for search are illustrated. In one configuration, a navigation device 103 has a display 201, a processor 202, a volatile memory 203, a text input interface 204 which is on-device, remote connectivity 205 to a server 101 through a network 102, and a local persistent storage 206. In another device configuration the device 103 may not have the local persistent storage 206. In such a scenario, the device 103 would have remote connectivity 205 to submit the query to the server 101 and retrieve results from it. In another configuration of the device 103, it may not have remote connectivity 205. In this scenario the navigation database may be locally resident on the local persistent storage 206. The persistent storage 206 may be a removable storage element, such as SD, SmartMedia, CompactFlash card etc. In a configuration of the device with remote connectivity 205 and the local persistent storage 206 for navigation, the device may use the remote connectivity for search/browse relevance data update or for the case where the navigation database is distributed on the local storage 206 and on the server 101.

Figure 3A:
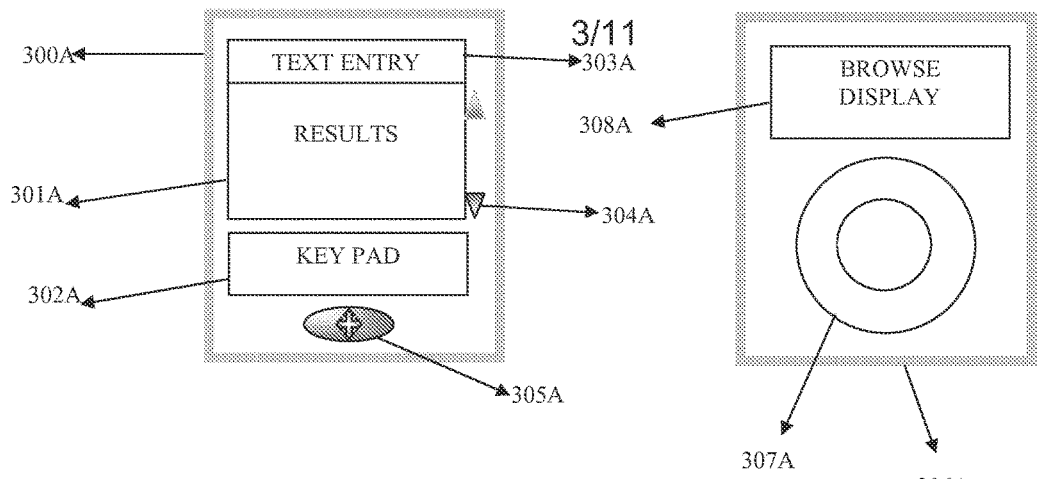
FIG. 3A illustrates instances of mobile device interface used to perform navigation of locally or remotely resident information.

FIG. 3A illustrates a mobile device 300A interface for navigating locally or remotely resident information. The user enters text using a keypad 302A and the entered text is displayed in a text field 303A. The navigation interface on the device is a navigation button 305A that facilitates movement minimally in horizontal and vertical directions. The results are displayed in a results area 301A corresponding to the input incremental text query or browse action. The user can scroll through the results using a scroll interface 304A using the navigation buttons 305A. An alternate scroll interface 307A is shown in a browse only device 306A (e.g. a music player like iPod where content is remotely resident and the user remotely navigates this content). The browse results are shown in the display 308A.

Figure 3B:
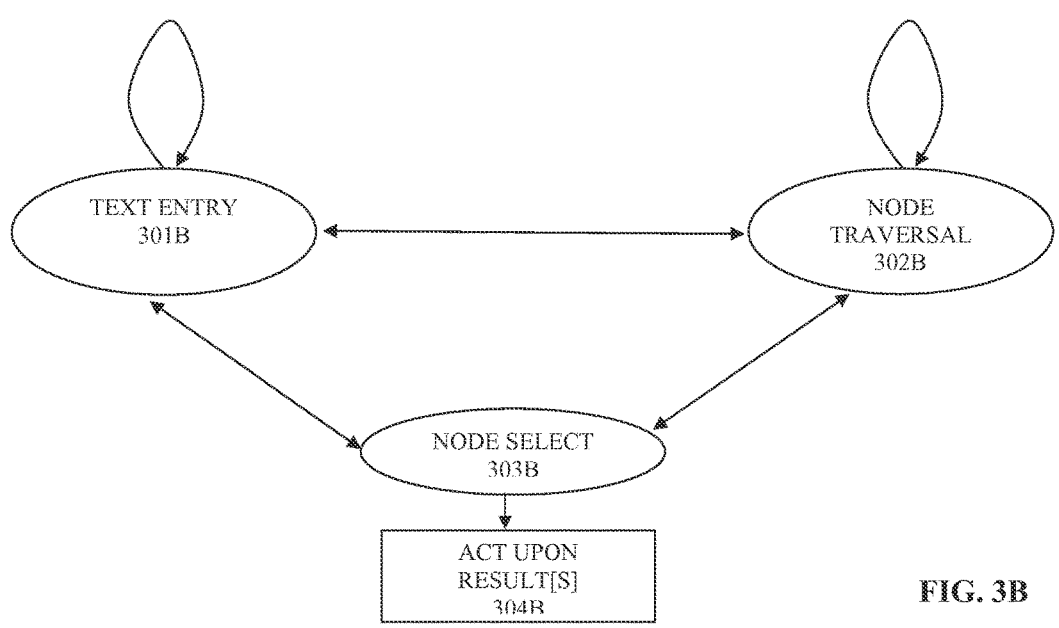
FIG. 3B illustrates the various states the user can transition through to arrive at the desired result through navigation of resident information.

FIG. 3B illustrates the various states of navigation actions a user could transition in order to get to the desired result. The user has the freedom to choose, either exclusively or a combination of, text entry and browse forms of discovery of the result(s) of interest. The actual path taken however may be influenced by both the user's intent and the information that is displayed. For instance, the user may start by entering text 301B, and may scroll through the displayed results 302B, pick a non-terminal node 303B and traverse the children of the non-terminal 302B. When the user discovers a result, he selects it 303B and performs an appropriate action 304B. This is discussed in further detail in FIG. 5 and FIG. 6.

Figure 3C:
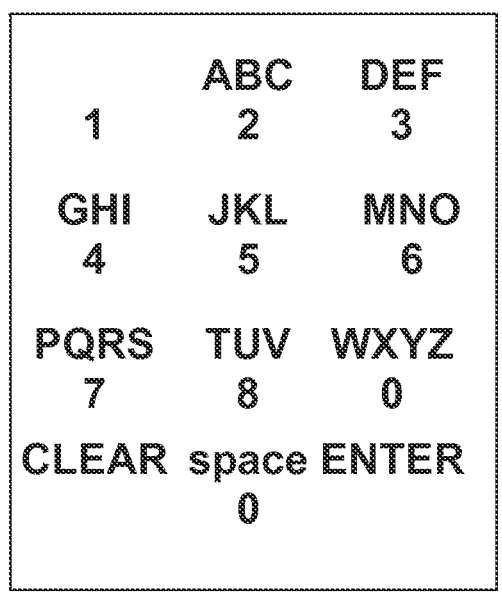
FIG. 3C illustrates a 12-key keypad with overloaded keys.

FIG. 3C illustrates a 12-key keypad with overloaded keys. As explained in greater detail in the incorporated earlier filed applications a keypad with overloaded keys may be used to perform text input for incremental searches.

Personalized Navigation Based on the User's Navigation Behavior

Figure 4:
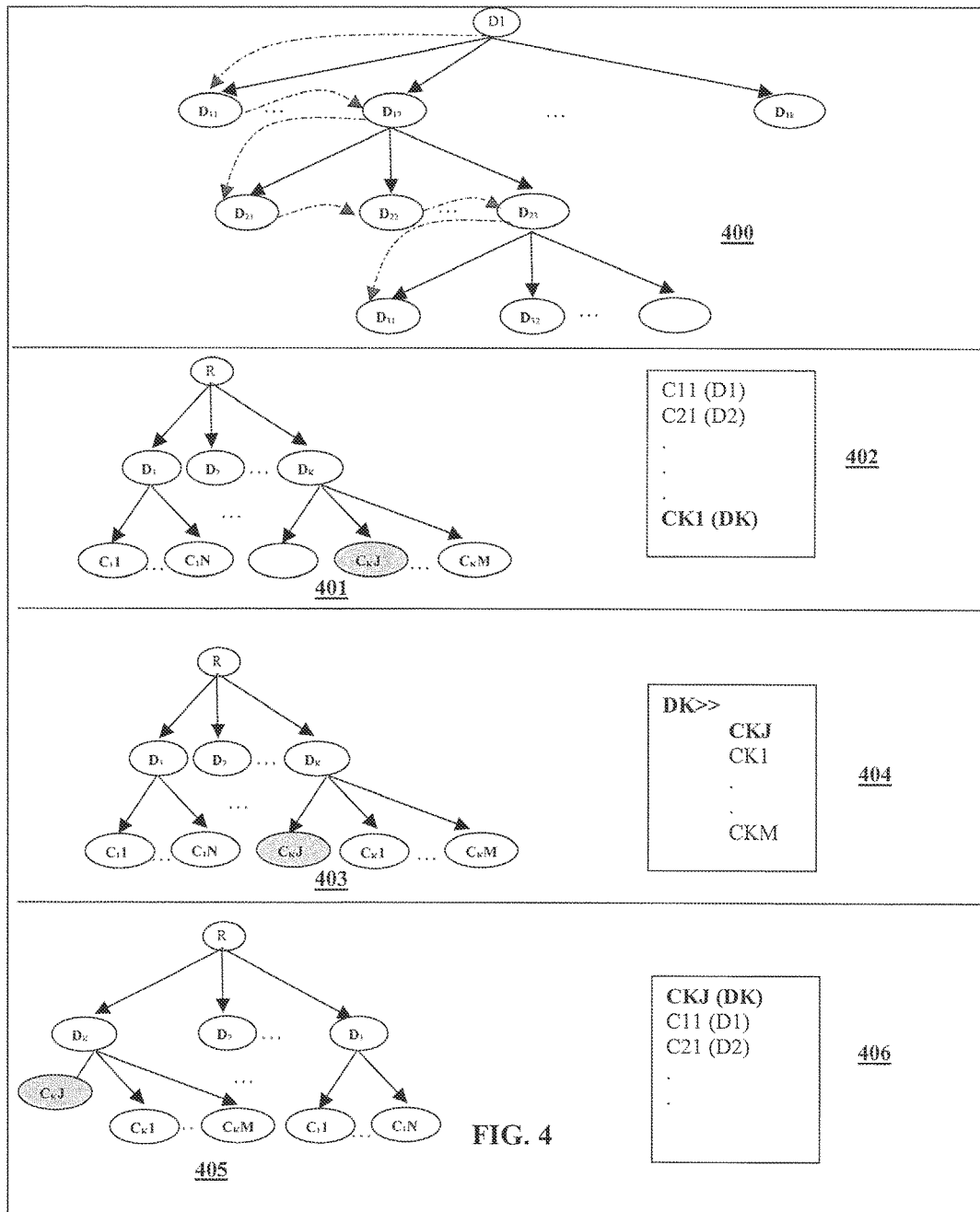
FIG. 4 illustrates a content hierarchy that automatically adjusts its structure (from the user's perspective) over time to match the user's preferences.

FIG. 4 graphically illustrates one embodiment of personalized navigation with the data hierarchy changing over time as a node is repetitively acted upon. As described in more detail below, and based on techniques described in one or more of the incorporated applications, the relevance weight for a particular node is influenced by the context of each repetitive action taken upon the node, including the time and location of the action. Therefore, the first discoverable node in the phonebook list can be based on both a user's past navigation behavior along with the current search location and time. For example U.S. patent application Ser. No. 11/682,693, entitled Methods and Systems For Selecting and Presenting Content Based On Learned Periodicity Of User Content Selection, filed on Mar. 6, 2007, describes techniques used to infer future behavior of the user from past behavior.

For illustrative purposes FIG. 4 shows a data hierarchy 400 represented as a tree—it could have been any other form of organization such as a graph. The initial condition of a search space, such as a phonebook, is shown as data nodes ($D_1$-$D_K$). Each data node is in turn a hierarchy of nodes of different depths. If a user were to navigate the tree purely as in a browse based fashion, then the number of steps (the cost of navigation) to reach a node at depth "i" in a pure browse based fashion is $\Sigma(L_{di}+N_i)$ ($1<=i<=I$) where L is the cost of linear traversal to a node at level "i" where the traversed node is an ancestor of the node of interest, and N is the cost of descending from an ancestor of the node to the first child in its immediate descendants list. This cost is primarily due to the linearization of the data hierarchy as the user descends down the tree by a pure browse action.

For example, a data hierarchy 401 is representative of a phonebook with data node $D_k$ representing John Doe, child node $C_k J$ representing John Doe's mobile phone number, and the other child node siblings to child node $C_k J$ representing John Doe's other contact information such as home and office numbers. The data hierarchy also contains node $D_1$ representing John Adams and node $D_2$ representing John Brown. The user interface could, from a rendering perspective, display both a contact (e.g. data nodes $D_1$ through $D_k$) and the associated primary contact number (e.g. child nodes $C_1 1$ through $C_k 1$). For example, when the user searches for "John" the result set 402 would contain $D_1$ (John Adams) and $C_1 1$ (John Adams' primary contact number), $D_2$ (John Brown) and $C_2 1$ (John Brown's primary contact number), up to and including $D_k$ (John Doe) and $C_k 1$ (John Doe's primary contact number). The user would have the option to either see other contact numbers for John Doe by descending down the tree, or directly making a call to the primary contact number initially presented.

If the user is interested in John Doe's mobile phone number, node $C_k J$, the user may discover the number using a text search or browse based navigation. In addition, if the user repetitively searches for or browses to node $C_k J$, the relevance weight assigned to this node would continue to strengthen with each repetitive action taken upon it. The increased relevance weight assigned to the node would be used to reorder the view of the navigation hierarchy from the user's perspective. As illustrated 401 prior to the learned preference and increased relevance weight, the node $C_k J$ would be the $j^{th}$ entry presented in John Doe's list of contact numbers. As illustrated in 403, after the increased relevance weight is applied, node $C_k J$ would bubble up to be the first entry within node $D_k$, e.g. becoming the first phone number in John Doe's contact folder. The result set 404 displayed for data node $D_k$ (John Doe) would now present John Doe's mobile phone number as the first entry in the result set.

As illustrated in 405, node $C_k J$'s weight would continue to strengthen with usage and eventually this node would become the first discoverable node in the phonebook list. After learning has taken place the result set 406 would have $D_k$ (John Doe) and $C_k J$ (John Doe's mobile number) as the first entry. The remainder of the result set, absent any other user selections, would contain $D_1$ (John Adams) and $C_1 1$ (John Adams' primary contact number), and $D_2$ (John Brown) and $C_2 1$ (John Brown's primary contact number).

Repetitive actions with regular patterns eventually result in the user not even having to do much. The relevant nodes receive an increased weight and the contact number would be rendered on the phone display at the appropriate time and location. It is important to note that this strengthening of the relevance weight of the node happens regardless of the type of navigation, either search or browse. Both result in the same form of reorganized view of the navigation hierarchy. For example, if the user always searches for John Doe and calls him, the increase in relevance weight of John Doe would result in John Doe being discovered with fewer characters. Finally, if the repetitive pattern is very regular, the text input step may even be eliminated. The first node in the phonebook context would contain John Doe's contact information and the user would just have to select the contact without entering any incremental text.

While the above illustration focuses on reordering for highly repetitive tasks, the system could also perform reordering of the user's view of the content space based on the broader knowledge of the user's tastes learned from the user's action patterns. For example, if the user always searches for action genre movies, then those movies could be given more relevance so as to be discovered more easily.

Figure 5:
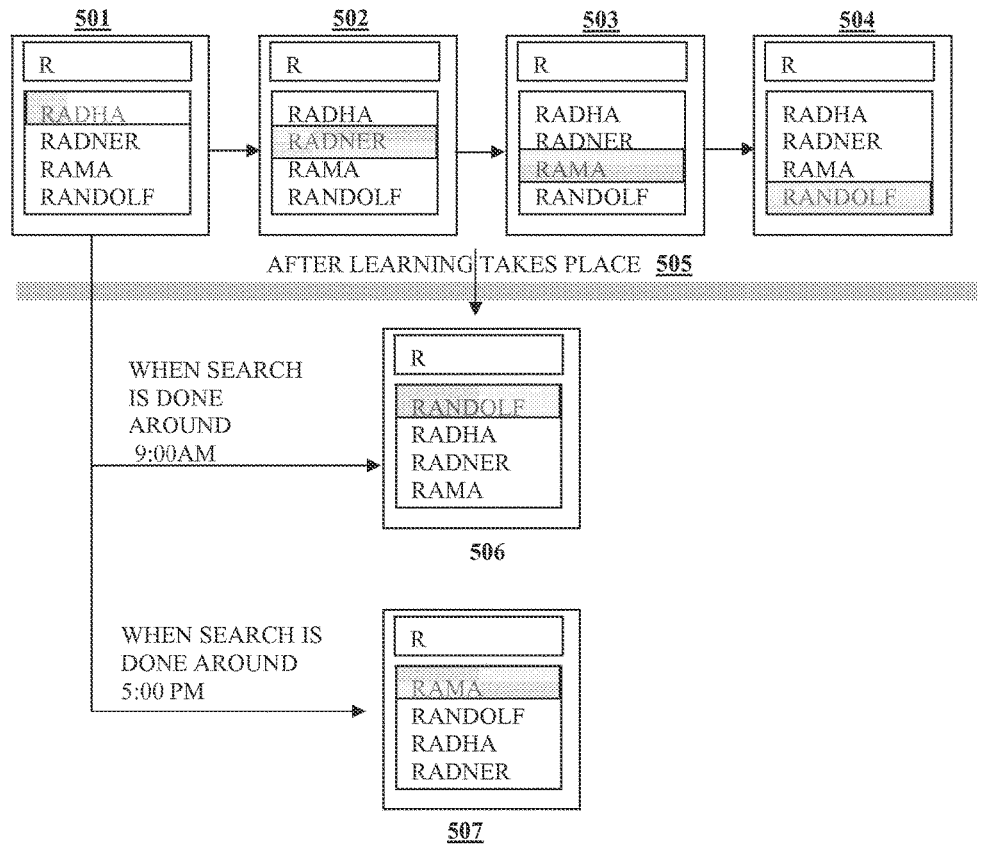
FIG. 5 illustrates the user's discovery of information using text search before and after system learns the user's action behavior.

FIG. 5 illustrates a user performing text input based incremental search on a mobile phone. The user types in 'R' (501), which results in the rendering of results starting with R. FIGS. 502-504 illustrate the user scrolling down to the last row to select RANDOLF to make a call. If this "search-call" action were a repetitive action (with time and location also considered), the system would learn this over time 505 and boost the relevance of RANDOLF so that the user can find this contact easily. Furthermore, if there is another person "RAMA" who is also called in a regular manner but in a different time window, then the entry of the same character "R" would bring up RANDOLF at 9:00 am (which is typically when a call is made to Randolf) and "Rama" at 5:00 pm (which is typically when a call is made to this person). Over time, this repetitive action would strengthen enough to even obviate the user to have to enter the character "R". Around 9:00 am in the morning, the phone would display "Randolf" on the top for easy access, and "Rama" around 5:00 pm. Thus, in this example, the presentment of the data hierarchy at 9:00 am is different from the presentment of the data hierarchy at 5:00 pm.

The time window identified for repetitive actions may be defined in advance or may be determined dynamically according to the frequency of the repetitive actions. For example, the time window may be set as 15-minute periods occurring during each day or the system may determine a larger window is appropriate for a particular day. The time window may also be differentiated by day of the week or date, e.g., different nodes may be of higher relevance during the week as compared to their relevance during the weekend. Finally, the system may interface with external applications and determine an ideal time window based on the data in the application. For example, the system may take data from a calendar application and boost the relevance of nodes based upon a weekly, monthly, or annual event (such as a birthday of a family member or a monthly project meeting).

Similarly, location of the user may influence the relevance of a node. For example, if the user is at work, the relevance of business contact information may be increased. Location may be determined by a variety of methods well known in the art, e.g., the user's device may have GPS capabilities.

Figure 6:
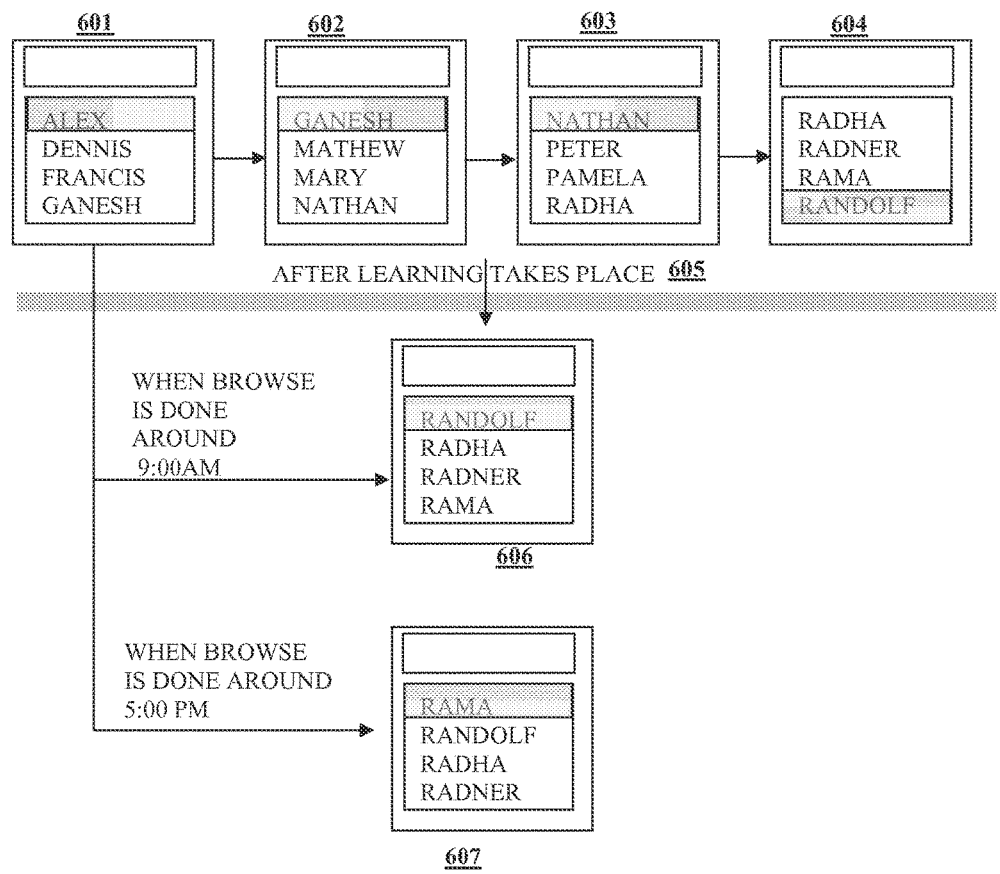
FIG. 6 illustrates the user's discovery of information using browse before and after system learns the user's action behavior

FIG. 6 illustrates the learning of a browse based repetitive navigation behavior. Steps 601 through 604 illustrate a user initially performing scroll (or page down operations) through a lexicographically sorted list of contacts to reach the desired contact, Randolf. The system learns this action behavior 605 over time, and automatically displays "Randolf s" number on the screen for easier access. Similarly, if the contact "Rama" were typically called at a different time window, then "Rama" would be displayed for easy access during that period of day. Thus from a lexicographic ordering (initial condition) the system learns the user's action patterns over time, to render orderings that reflect the most likely actions the user would perform for that particular time and location.

Figure 7:
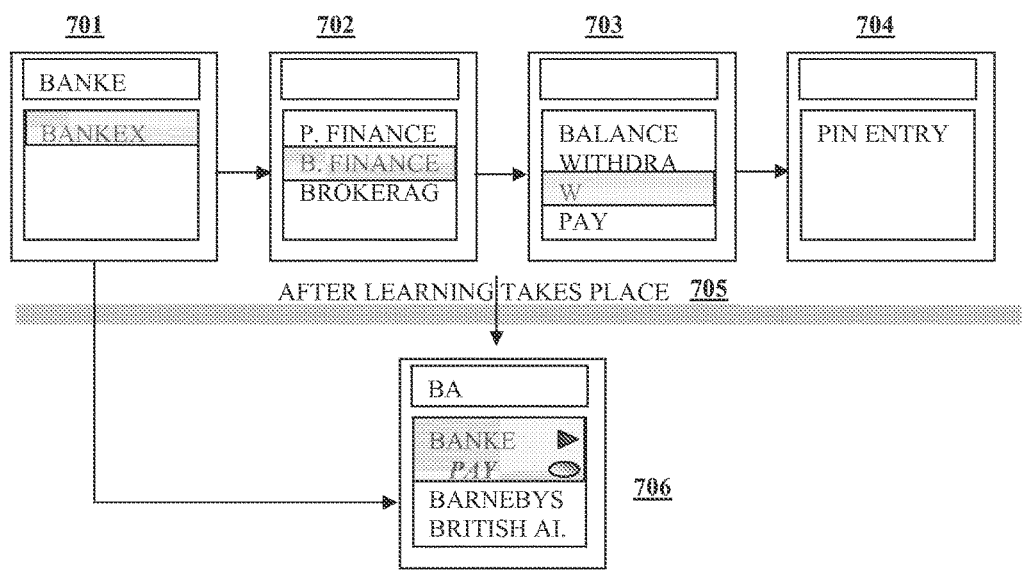
FIG. 7 illustrates the user performing a repetitive banking task before and after system learns the user's action behavior.

FIG. 7 illustrates another instance where a search and browse based navigation to reach an action is learned by the system and optimized to provide a better user experience. The user performs an incremental search 701, entering "BANKE" which results in discovering the bank of choice "BANKEX." The user then browses to the bank finance portion of the bank "B. FINANCE," 702 followed by selecting the payment item "PAY" from the submenu 703. The first step of making a payment is pin entry 704. As the system learns 705 the user's actions over time, the user's effort expended is reduced both in the number of characters used to get to the desired bank ("BA") and the number of browse actions the user needs to perform—the bill pay option is shown along with the bank in the result. The user now has to enter three fewer characters during the incremental text search, and does not need to browse through two submenus to select the payment item. This form of rendering an aggregate node, along with the most likely child node that user may act upon, gives the user the choice to act on both items without further effort. The user can select the pay bill option or choose to browse all the other choices.

Figure 8:
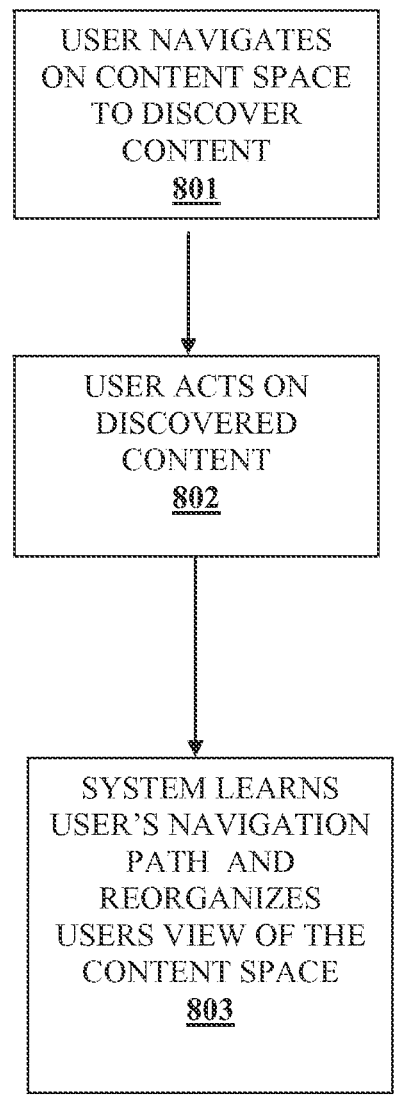
FIG. 8 summarizes the basic concept of personalized navigation.

FIG. 8 summarizes the basic concept of personalizing the content space of the user based on learned behavior. The user's navigation through the content space 801 and actions on discovered content 802 is learned by the system. Each time a user performs an action on a node, the relevance of that node (for that particular time and location), with respect to the user is altered. The view of the content hierarchy from the user's perspective is altered to match the user's learned behavior and preferences.

Figure 9:
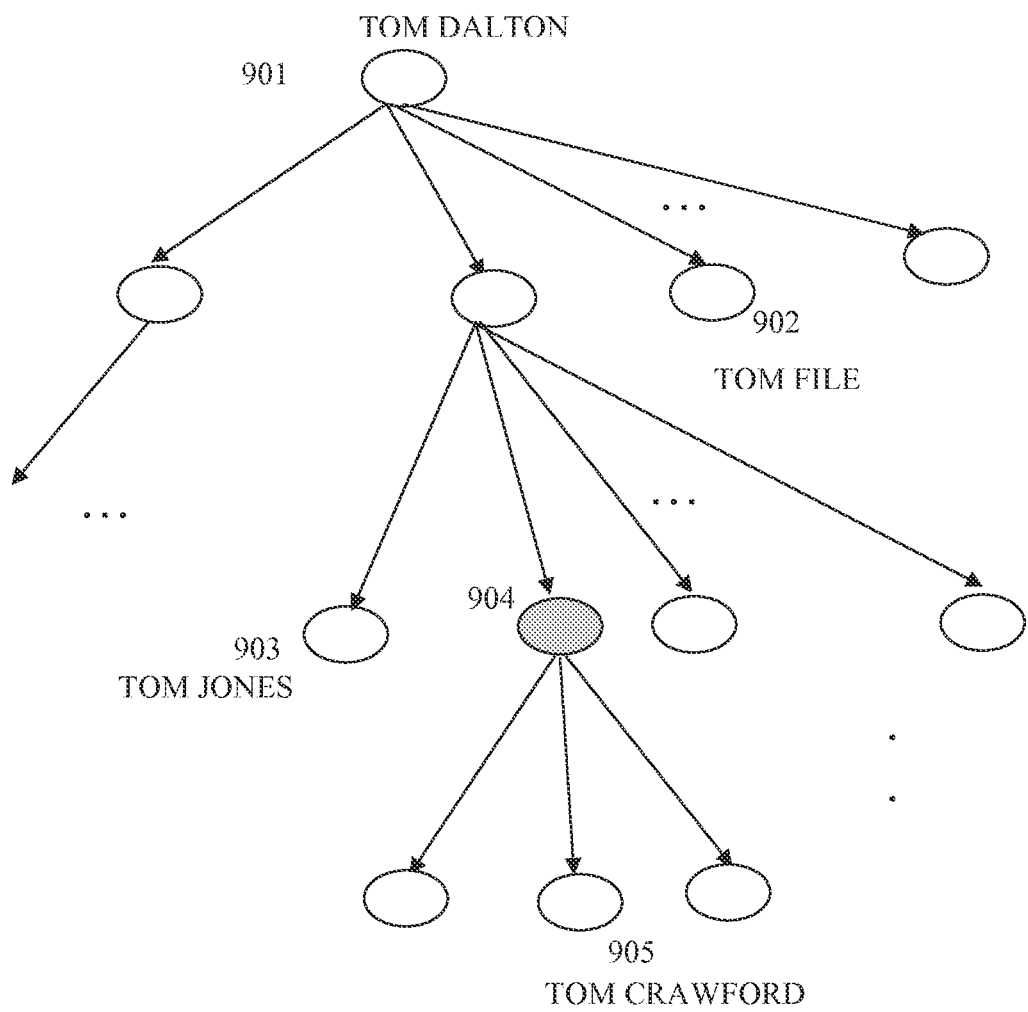
FIG. 9 illustrates a corporate hierarchy that is being navigated by the user.

Personalized Navigation Based on the User's Relationship to the Information Hierarchy FIG. 9 illustrates an instance of a corporate employee hierarchy tree with a user 904 at a particular level in this hierarchy, specifically level 2. Tom Dalton 901 is at level 0, Tom Clancy 902 is at level 1, Tom Jones 903 is a peer of the user 904 at level 2, and Tom Crawford 905 is a direct report of the user 904 on level 3. In the initial conditions state, a user who just joins a company or moves to a new position within a company, can benefit from the present invention, which adjusts the organization tree to help the user 904 easily find the members of the group at his level, his direct reports, or his manager. The user can easily find the person he is looking for by entering just a few characters of an incremental search or with minimal steps using a pure browse search.

When the user 904 searches for a particular person by entering text, e.g., "TOM", the system automatically lists the results in descending order of the proximity of the matched employee(s) in relationship to the user's position in the hierarchy. However, after learning, the nodes that are immediate descendents to the user's node may trump the user's sibling nodes, since the immediate descendents may be direct reports. Additionally, if the user 904 is discovering the information using an incremental search, e.g., "TO", results may be shown with matches from different nodes as clusters for each level with one match displayed with the aggregate node (e.g. TOM CLANCY at Level 1, TOM CRAWFORD Level 3, TOM DALTON level 0). The system may provide a means to navigate these aggregate nodes, so the user can quickly get to any level. If the user is navigating the tree purely by a browse means, then the employees at the user's level (or his immediate reports) will be listed first as aggregates followed by other levels. This form of navigation would be more user-friendly than a pure lexicographically ordered browse tree.

The user search experience is also improved, in comparison to pure organization based clustering, by reordering the information hierarchy to match the user's repetitive action behavior. For example, if the user 904 repetitively navigates to a sibling node to perform an action (e.g. navigating to the node for Tom Jones 903 to place a phone call), then the ordering of the user's siblings would be adjusted over time to reduce this navigation distance by bringing that node closer to the user. This approach can also be used for any node that is at any level. For example, if the user 904 always navigates to the node for Tom Clancy 902 to place a phone call, then that node is reordered at its own level to come up quicker. Additionally with time, the nodes that are frequently visited in the hierarchy would move closer to the user's home node 904.

The navigation process within the corporate employee hierarchy tree could have been text-based search or browse based navigation. Over time the nodes that are frequently visited in the hierarchy would move closer to the user's home node within the hierarchy, thus easing their discovery either by search or browse. If the search were an incremental search, over time personalization would reduce the number of characters required for discovering the node. If the search was a browsed based navigation, over time personalization would reduce the number of user selections required for discovering the node.

Figure 10:
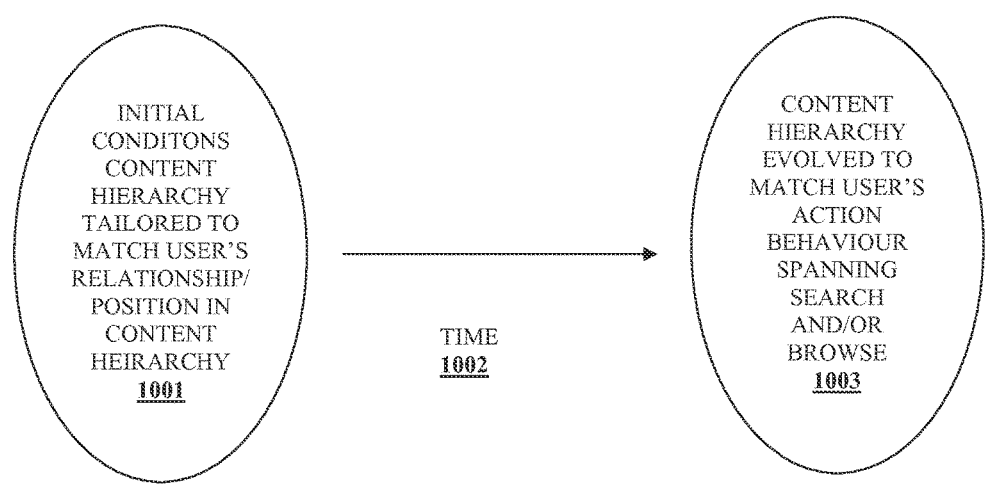
FIG. 10 illustrates the initial conditions and the personalized navigation as the system continues to learn the user's action behavior.

FIG. 10 illustrates the evolution of the navigation system with time 1002 as the navigation hierarchy is reordered to match the user's action behavior (e.g. making a phone call after discovering a node of interest). In an embodiment of the invention, the initial conditions 1001 would start with the "locus of relevance centered" at the user's position in the organization hierarchy. As the user navigates hierarchy and selects specific content items, the hierarchy would evolve to bring referenced nodes closer to user's locus of relevance. For example, using the method described in FIG. 4 above, this could be accomplished by assigning initial relevance weights to nodes in the navigation hierarchy based on the users position within a corporate hierarchy. The initial relevance weights could be assigned such that, prior to learning, the results would be ordered to return peers, then subordinates, then supervisors, and finally persons unrelated to the user in the corporate hierarchy. As the user navigates and selects content items from the navigation hierarchy the relevance weights of particular nodes, with respect to the particular user performing the search, would be increased. When the user makes subsequent searches, the nodes with higher relevance weights would be presented higher in the search results.

In another embodiment of the invention the locus of relevance would always remain at the root of the organization hierarchy, with the user's nodes of interest hoisted to the root for easy access. This method of reordering would be meaningful for information finding in an entertainment space, where no prior knowledge of the user's interest is known, and hence there is no a priori relationship between the user and the content navigation hierarchy.

Another instance of automatic adjustment of circle of relevance is where the user is part of a defined group, for example, where the user is a member of an Instant Messaging group or an online community group, such as a Yahoo group. The system would automatically increase the relevance weights of the members of the group in relation to the user. Here the adjustment of the circle of relevance is done by the system merely by the participation of the user in these groups and no explicit action by the user is required. This is similar to the corporate setting where a user can be grouped with his or her peers, or where a user can be grouped with all other employees with offices on the same floor in a building.

Additionally, the system can take advantage of dynamic groups created for projects spanning employees in the corporate hierarchy. The members of these dynamically created groups would also move closer to the "locus of relevance" of the user. These groups could have been created explicitly in the corporate database, or the system may interface with external applications, such as a mailing list in an email application, in order to discover these dynamic groups. Once a dynamically created group is detected, again using the techniques described above, the relevance weights of the members of that group can be adjusted such that group members are returned higher in the result set, overriding the default corporate hierarchy. For example, after a new emailing list for a project is created, the relevance weights of the members of that project can be adjusted and the results would be ordered to return project members, then peers, then subordinates, then supervisors, and finally persons unrelated to the user in the corporate hierarchy.

Automatic adjustment of locus or circle of relevance would also be applied in a transitive manner between individuals or groups of individuals based on the actions of the individuals. For example, in a community, if a Susie calls Barbara often, and Barbara calls Kate often, then the likelihood of Susie calling Kate increases over time. Hence, when Susie makes a search or performs a browse, the relevance of ordering of Kate is increased, such that Susie can discover Kate more easily. In this case, when Susie navigates and selects the contact information for Barbara, the relevance weight for that node is adjusted. In addition, the relevance weights for any nodes that Barbara has selected, e.g. Kate, are also increased with respect to Susie. The contact information for both Barbara and Kate will now be returned higher in the result set for any subsequent searches by Susie.

In an embodiment of the invention the locus of relevance would also be adjusted over time by the system taking into account the actions taken by groups of individuals. For example, if members of two groups in an organization hierarchy communicate often with each other (e.g. the action taken by users in this case being making a phone call), then the two groups would come closer to each other in the navigation hierarchy. So when searches are done by a member of one of these groups, the system would give a higher relevance to people from the other group with which the communication was high—this would facilitate the discovery of the desired result with fewer characters in the case of incremental search. Similarly, in a browse based discovery, the other group would be found closer to the user's own group in the organization hierarchy.

For example, consider a corporate hierarchy where Able and Baker are members of the accounting department, Charlie and Dawn are members of the tax department, and Eugene is a member of the legal department. If Able calls Charlie on a regular basis then the accounting and tax departments become closer to each other in the navigation hierarchy. Here the relevance weights for all members of both departments are adjusted, not just those for Able and Charlie. So when Baker searches the corporate hierarchy members of the tax department will have a higher relevance than members of the legal department. This is due to the contacts, over time, between members of the two departments, e.g. the contacts between Able and Charlie, and the associated adjustments to the relevance weights for all members of both departments.

Having described preferred embodiments of the present invention, it should be apparent that modifications can be made without departing from the spirit and scope of the invention. For example, the relative weighting of nodes has been used herein in the context of a phone book. However, embodiments of the invention can be implemented for any form of node based content space, such as genres of movies.

What is claimed is:

1. A method for generating for display identifiers of videos, the method comprising:
   retrieving, using control circuitry, from a database at a server, data indicating a relationship between a first user and a second user, wherein the data is based on information indicating a frequency at which the first user and the second user interacted during a first period of time;
   making a determination that a video is relevant to the first user;
   in response to determining that the video is relevant to the first user, assigning a first relevance weight of the video to the second user based on the frequency at which the first user and the second user interacted during the first period of time;
   receiving information indicating a frequency at which the first user and the second user interacted during a second period of time;
   determining that the frequency at which the first user and the second user interacted during the second period of time is more than the frequency at which the first user and the second user interacted during the first period of time;
   in response to determining that the frequency at which the first user and the second user interacted during the second period of time is more than the frequency at which the first user and the second user interacted during the first period of time:
      increasing the first relevance weight of the video to the second user; and
      generating, for display in a user interface of the second user, an identifier of the video, wherein placement of the identifier of the video in the user interface is based on the first relevance weight of the video to the second user.

2. A system for generating for display identifiers of videos, the system comprising control circuitry configured to:
   retrieve, from a database at a server, data indicating a relationship between a first user and a second user, wherein the data is based on information indicating a frequency at which the first user and the second user interacted during a first period of time;
   make a determination that a video is relevant to the first user;
   in response to determining that the video is relevant to the first user, assign a first relevance weight of the video to the second user based on the frequency at which the first user and the second user interacted during the first period of time;
   receive information indicating a frequency at which the first user and the second user interacted during a second period of time;
   determine that the frequency at which the first user and the second user interacted during the second period of time is more than the frequency at which the first user and the second user interacted during the first period of time;
   in response to determining that the frequency at which the first user and the second user interacted during the second period of time is more than the frequency at which the first user and the second user interacted during the first period of time:
      increase the first relevance weight of the video to the second user; and
      generate, for display in a user interface of the second user, an identifier of the video, wherein placement of the identifier of the video in the user interface is based on the first relevance weight of the video to the second user.

3. The method of claim 1, further comprising calculating a second relevance weight that reflects an amount of relevance of the video to the first user.

4. The method of claim 1, wherein the data indicating the relationship between the first user and the second user is based on information indicating that the first user and the second user belong to a same group.

5. The method of claim 1, wherein the first determination is based on receiving a selection of the video by the first user.

6. The method of claim 1, wherein the first determination is based on receiving a search for the video performed by the first user.

7. The method of claim 1, comprising:
   recording the amount of interaction between the first user and the second user dining the first period of time.

8. The method of claim 1, further comprising:
   receiving, using the control circuitry, a selection of the identifier of the video from the second user; and
   in response to receiving the selection, generating the video for display for the second user.

9. The system of claim 2, wherein the control circuitry is further configured to calculate a second relevance weight that reflects an amount of relevance of the video to the first user.

10. The system of claim 9, wherein the first determination is based on the second relevance weight.

11. The system of claim 2, wherein the data indicating the relationship between the first user and the second user is based on information indicating that the first user and the second user belong to a same group.

12. The system of claim 2, wherein the control circuitry is further configured to make the first determination based on receiving a selection of the video by the first user.

13. The system of claim 2, wherein the control circuitry is further configured to make the first determination based on receiving a search for the video performed by the first user.

14. The system of claim 2, wherein the control circuitry is further configured to:
   record the amount of interaction between the first user and the second user during the first period of time.

15. The system of claim 2, wherein the control circuitry is further configured to:
  receive a selection of the identifier of the video from the second user; and
  generate the video for display for the second user in response to receiving the selection.

16. The method of claim 3, wherein the first determination is based on the second relevance weight.

\* \* \* \* \*

UNITED STATES PATENT AND TRADEMARK OFFICE
CERTIFICATE OF CORRECTION

PATENT NO. : 10,146,840 B2
APPLICATION NO. : 14/793074
DATED : December 4, 2018
INVENTOR(S) : Aravamudan et al.

Page 1 of 1

It is certified that error appears in the above-identified patent and that said Letters Patent is hereby corrected as shown below:

In the Claims

Column 12, Claim 7, Line 39, change "comprising" to --further comprising--.

Column 12, Claim 7, Line 41, change "dining" to --during--.

Signed and Sealed this
Nineteenth Day of March, 2019

Andrei Iancu
*Director of the United States Patent and Trademark Office*